(12) United States Patent
Ingraham

(10) Patent No.: US 12,022,816 B2
(45) Date of Patent: Jul. 2, 2024

(54) SANDWICHED INVERTED HORSESHOE AND METHODS OF USING SAME

(71) Applicant: Challen Ingraham, Tabernacle, NJ (US)

(72) Inventor: Challen Ingraham, Tabernacle, NJ (US)

( * ) Notice: Subject to any disclaimer, the term of this patent is extended or adjusted under 35 U.S.C. 154(b) by 267 days.

(21) Appl. No.: 17/505,894

(22) Filed: Oct. 20, 2021

(65) Prior Publication Data

US 2023/0122576 A1 Apr. 20, 2023

(51) Int. Cl.
| | | |
|---|---|---|
| A01L 3/04 | (2006.01) | |
| A01L 3/00 | (2006.01) | |
| A01L 5/00 | (2006.01) | |
| B32B 3/26 | (2006.01) | |
| B32B 5/14 | (2006.01) | |
| B32B 5/18 | (2006.01) | |
| B32B 7/022 | (2019.01) | |
| B32B 7/08 | (2019.01) | |
| B32B 9/02 | (2006.01) | |
| B32B 9/04 | (2006.01) | |
| B32B 15/14 | (2006.01) | |

(52) U.S. Cl.
CPC ............... *A01L 5/00* (2013.01); *A01L 3/00* (2013.01); *B32B 3/266* (2013.01); *B32B 5/14* (2013.01); *B32B 5/18* (2013.01); *B32B 7/022* (2019.01); *B32B 7/08* (2013.01); *B32B 9/025* (2013.01); *B32B 9/046* (2013.01); *B32B 15/14* (2013.01); *B32B 2260/021* (2013.01); *B32B 2260/046* (2013.01); *B32B 2571/00* (2013.01)

(58) Field of Classification Search
CPC ...... A01L 5/00; A01L 3/00; A01L 3/04; A01L 1/04
See application file for complete search history.

(56) References Cited

U.S. PATENT DOCUMENTS

| | | | | |
|---|---|---|---|---|
| 158,284 | A * | 12/1874 | Kintzing et al. | A01L 5/00 168/DIG. 1 |
| 602,046 | A * | 4/1898 | Hitch | A01L 1/04 168/11 |
| 602,387 | A * | 4/1898 | Krumscheid | A01L 1/04 168/13 |
| 655,829 | A * | 8/1900 | Lovett | A01L 1/04 168/13 |
| 2,705,536 | A * | 4/1955 | Phreaner | A01L 1/04 168/DIG. 1 |
| 2014/0231100 | A1 * | 8/2014 | Ford | A01L 5/00 168/4 |

(Continued)

FOREIGN PATENT DOCUMENTS

| | | | | |
|---|---|---|---|---|
| BR | PI0401198 | A * | 3/2005 | |
| BR | 202015020022 | U2 * | 3/2017 | |
| DE | 19732269 | A1 * | 2/1999 | ............... A01L 5/00 |

(Continued)

*Primary Examiner* — Son T Nguyen
(74) *Attorney, Agent, or Firm* — SLEMAN & LUND LLP

(57) ABSTRACT

A horseshoe having a front end and a back end includes a base plate having a first stiffness, an intermediate layer having a second stiffness, the second stiffness being less than the first stiffness, the intermediate plate being disposed adjacent the base plate, a top plate disposed adjacent the intermediate layer and a heel wedge capable of articulating relative to the base plate.

15 Claims, 4 Drawing Sheets

(56) References Cited

U.S. PATENT DOCUMENTS

2014/0231101 A1* 8/2014 Ford .................... A01L 3/02
                                                    168/4
2020/0146272 A1* 5/2020 Ingraham ................ A01L 3/04

FOREIGN PATENT DOCUMENTS

| DE | 10313573 A1 * | 7/2003 | ................ A01L 3/00 |
| DE | 102016011019 A1 * | 3/2018 | |
| EP | 3103331 A1 * | 12/2016 | ................ A01L 3/00 |
| EP | 3243379 A1 * | 11/2017 | ........... A01K 13/007 |
| GB | 191409047 A * | 10/1914 | |
| WO | WO-9710708 A1 * | 3/1997 | ................ A01L 3/00 |
| WO | WO-0016614 A1 * | 3/2000 | ........... A01K 13/007 |
| WO | WO-2018023173 A1 * | 2/2018 | ................ A01L 1/00 |

\* cited by examiner

SANDWICHED INVERTED HORSESHOE AND METHODS OF USING SAME

FIELD OF THE DISCLOSURE

The present disclosure relates to devices and methods for treating certain diseases in hoofed animals. More particularly the present disclosure relates to specialty horseshoes for hoofed animals having conditions, such as laminitis.

BACKGROUND OF THE DISCLOSURE

Proper load distribution on a horse's feet is important to the overall health of the animal. Laminitis is a serious medical condition in horses and other hoofed animals, and despite significant advances in veterinarian medicine, remains a major reason for euthanasia of such animals. Laminitis is an inflammation of the lamina and the inner hoof wall. Laminitis is characterized by separation of the hoof wall from the distal phalanx due to the deterioration and detachment of the lamina, which holds the two together. Failure of the laminar attachments, in a majority of cases is limited to the toe region. It is hypothesized that without the distal phalanx properly attached to the inside of the hoof wall, the weight of the horse and the forces of locomotion by the deep digital flexor tendon cause the distal phalanx to rotate away from the hoof capsule. This process shears the vasculature and crushes the corium (dermis) of the sole, causing unrelenting pain and a characteristic lameness. Radiographic and necropsy examination of the feet of affected horses show a characteristic rotation of the dorsal border of the distal phalanx away from the dorsum of the hoof wall.

Laminitis can occur secondary to many diseases of the horse, but is common following overeating, colic, fever, shock, pneumonia, injury and obesity.

Many hoofed animals, and particularly horses, are susceptible to laminitis and significant economic loss occurs due to severe pain and debilitation of these animals. Due to the insidious nature of the disease process, damage to the laminae often occurs prior to clinical evidence of abnormality.

Current medical therapies include identification and treatment of the underlying disease, systemic anti-inflammatory medications and rest. A more aggressive treatment of the sequela of laminitis involves severing the deep digital flexor tendon. Additionally, support of the sole has met with some success utilizing deep sand flooring, peat moss and foam sole pads.

Surgical transection of the deep digital flexor tendon (DDFT) has also been used to reduce the shearing forces during the acute phase of laminitis. One study reported a 60% survival rate at 2 years after the procedure. Those animals who do recover from the severing of the deep digital flexor tendon are usually not comfortable enough to ride. Even with these issues in mind, current veterinary practices suggest that a deep digital flexor tenotomy is the fastest way to counteract the rotational forces and restore the perfusion and tissue mass to the dorsal regions of the foot.

Other conventional methods include the use of wedge shoes, but these suffer from several shortcomings.

SUMMARY OF THE DISCLOSURE

In some embodiments, a horseshoe having a front end and a back end includes a base plate having a first stiffness, an intermediate layer having a second stiffness, the second stiffness being less than the first stiffness, the intermediate plate being disposed adjacent the base plate, a top plate disposed adjacent the intermediate layer and a heel wedge capable of articulating relative to the base plate.

BRIEF DESCRIPTION OF THE DISCLOSURE

Various embodiments of the presently disclosed horseshoes are shown herein with reference to the drawings, wherein.

Various embodiments of the present invention will now be described with reference to the appended drawings. It is to be appreciated that these drawings depict only some embodiments of the invention and are therefore not to be considered limiting of its scope.

DETAILED DESCRIPTION

Despite the various improvements that have been made to horseshoes and their methods of use, conventional devices suffer from some shortcomings as described above.

There therefore is a need for further improvements to the devices, systems, and methods of providing support to hoofed animals. Among other advantages, the present disclosure may address one or more of these needs. As used herein, the term "front" will refer to a location or direction closer to an animal's toe and the term "back" will refer to a location or direction closer to the animal's heel. "Top" refers to a structure closer to the hoof of an animal, while "bottom" refers to a structure further farther from the animal's hoof.

FIG. 1 illustrates a generally U-shaped horseshoe 100, the horseshoe having an inverted orientation that is the opposite of a traditional horseshoe so as to include a connected or closed portion adjacent the back end 102 (i.e., adjacent the horse's heel), and an open portion adjacent the front end 104 (i.e., adjacent the horse's toe). Traditional horseshoes are closed near the toe and open near the heel.

Figure 1A:
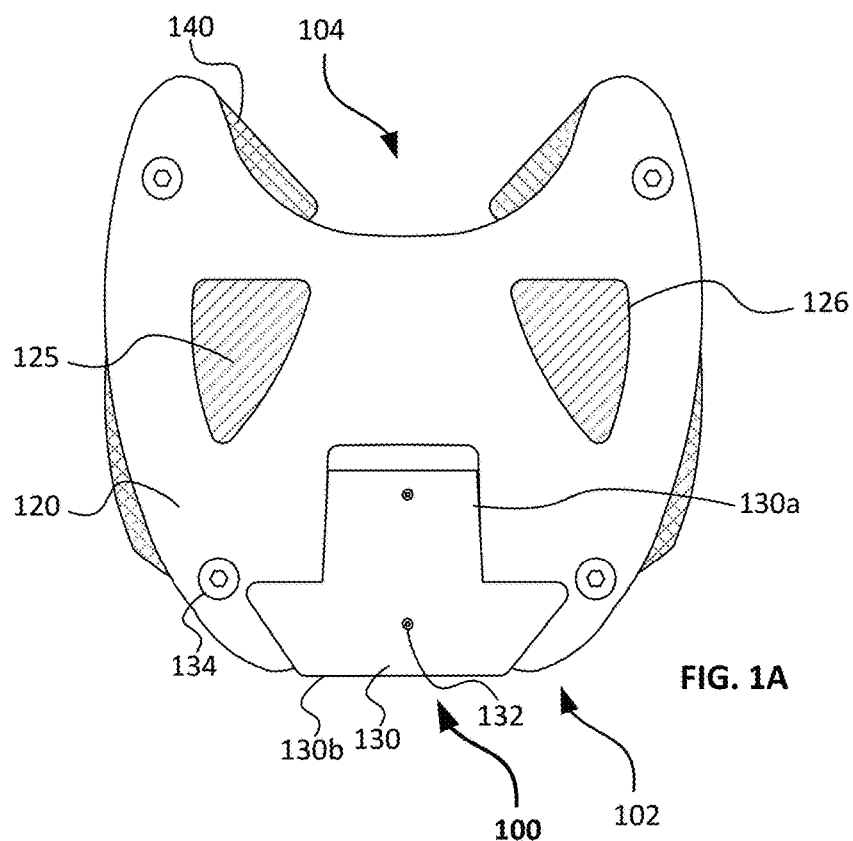
FIG. 1A is a schematic bottom view of one example of a horseshoe according to the present disclosure.
Figure 1B:
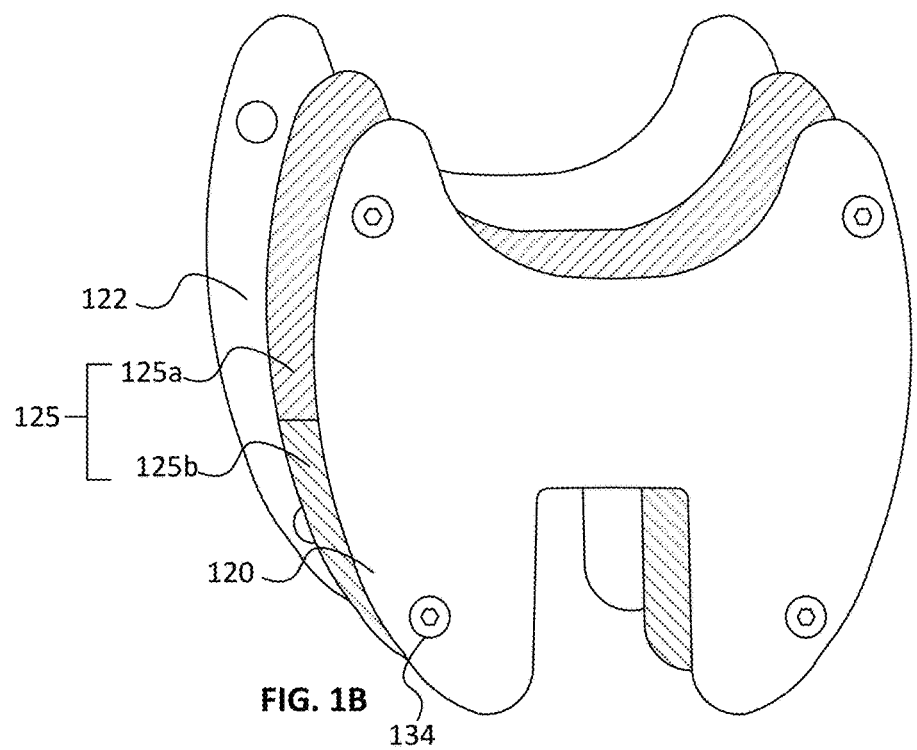
FIG. 1B is a schematic representation of several layers of the horseshoe according to the present disclosure.
Figure 2:
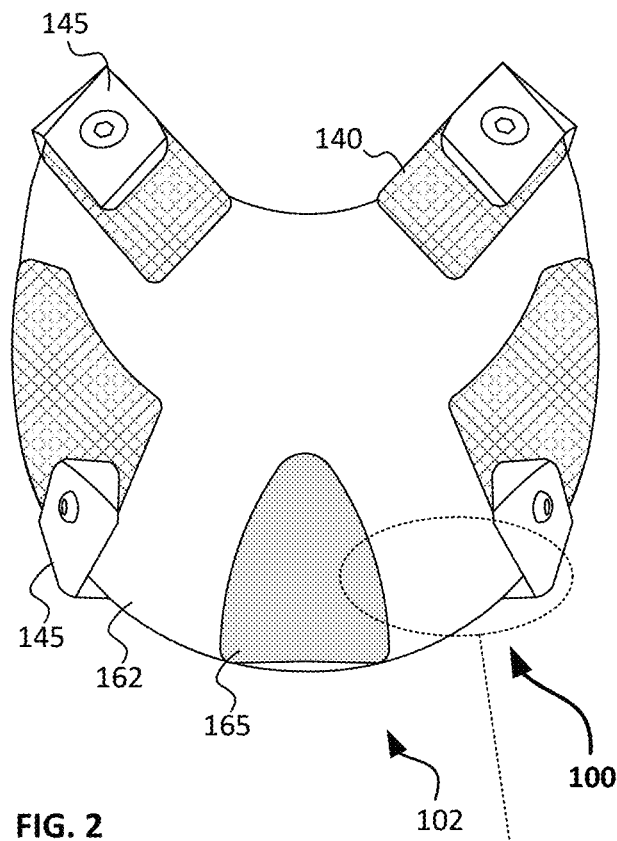
FIG. 2 is a schematic top view of the horseshoe of FIG. 1A.
Figure 3:
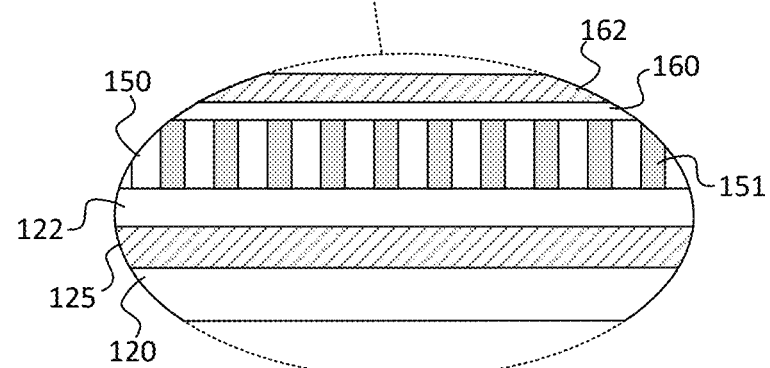
FIG. 3 is a schematic representation showing various layers of the horseshoe.

Horseshoe 100 includes several components coupled together, which will be appreciated from examining the bottom view of the horseshoe of FIG. 1A, and the corresponding top and side views of FIGS. 2-3. Beginning with the lowermost element, as shown in FIG. 1, horseshoe 100 includes an inverted T-shaped heel wedge 130. Heel wedge 130 may be formed of a hard plastic or metal. In one example, heel wedge 130 may have a shape that includes an axial portion 130a and a trapezoidal or rectangular base 130b. Base 130b may mimic the curvature of a traditional horseshoe and includes a number of pins 132 to couple the wedge to other components via fasteners or screws. Heel wedge 130 may articulate so that it moves relative to other components of the horseshoe, (e.g., base plate 120) to increase or decrease the offset of the wedge and the base plate.

Heel wedge 130 may be coupled to base plate 120 directly or via other components. As shown in FIG. 1B, three components form the main body of horseshoe 100: base plate 120, intermediate layer 125 and top plate 122. Any combination or all of base plate 120 and top plate 122 may be formed of a hard plastic or metal. In at least some examples, base plate and top plate 120, 122 are formed of a metal or carbon fiber. In at least some examples, intermediate layer is formed of a cushioning material that has a lower stiffness than the base plate and/or the top plate, such as a urethane foam. As shown, the intermediate layer 125 may be sandwiched between the base plate and the top plate 120, 122. In some examples, the intermediate layer 125 is divided into a first portion 125a (e.g., EVA) and a second portion 125b (e.g., leather) formed of different materials or a same material. Base plate 120 and top plate 122 may be formed of a same or similar shape and/or size, and may be substantially oval or egg-shaped and include a pair of winged halves joined together to define a lower slot and an upper concavity. In some examples, the base plate and/or the top plate 120, 122 include cutouts 126 through which the intermediate layer is visible. Cutouts 126 may be generally triangular or may be formed of other suitable shapes (e.g., rectangular, squares, ovals, circles, etc.). Fasteners 134 may couple these components together.

Additional layers may be added to top plate 122 for cushioning. Turning to FIG. 3, a multi-layer cushioning system is shown. Base plate 120 is shown as well as intermediate layer 125 and top plates 122. The cushioning system may include a lower layer 150 (e.g., 30 durometer EVA) impregnated with a second material, such as silicone 151. An intermediate layer 160 may be formed of leather (e.g., ⅛-inch-thick leather) and an upper layer may include a urethane foam. The cushioning layers 150, 160, 162 may be coupled together via glue, fasteners or other suitable techniques. In some examples, the materials for the cushioning layers may be chosen so that the stiffness of the materials decrease from the lower layer to the intermediate layer, and from the intermediate layer to the upper layer. A triangular cushion 165 may also be added adjacent the heel opposite wedge 130, the triangular cushion being formed of the same material as lower layer 150 (e.g., 30 durometer EVA).

Turning to the top view of FIG. 2, four anchoring members 145 may be attached to base plate 120, top plate 122 or both, and may project toward the top of the device (i.e., toward the hoof of the animal) to increase rigidity of the device and stabilize it around the hoof when attached. As best shown in FIG. 2, each anchoring member 145 may include an arm that projects perpendicular to the main body. It will be understood that more or less anchoring members 145 may be used as appropriate. In at least some examples, anchoring members 145 are formed of a metal or a copolymer. Alternatively, pairs of the anchoring members are formed of different materials.

A fabric 140 may be disposed adjacent to, or coupled to each of anchoring members 145. The fabric 140 may be formed of a woven nylon fabric (or nylon webbing) or other suitable material. In some examples, the nylon material is reusable as it allows for mechanical adherence of an epoxy or other material, but does not allow impregnation of the adhesive material in the nylon material. The material of fabric 140 may be selected to be durable and to have a surface capable of being securely coupled to the hoof of an animal using an epoxy or other suitable adhesives. In at least some examples, a hook-and-loop (e.g., VELCRO® brand of material) may be used instead of adhesive material.

Figure 4:
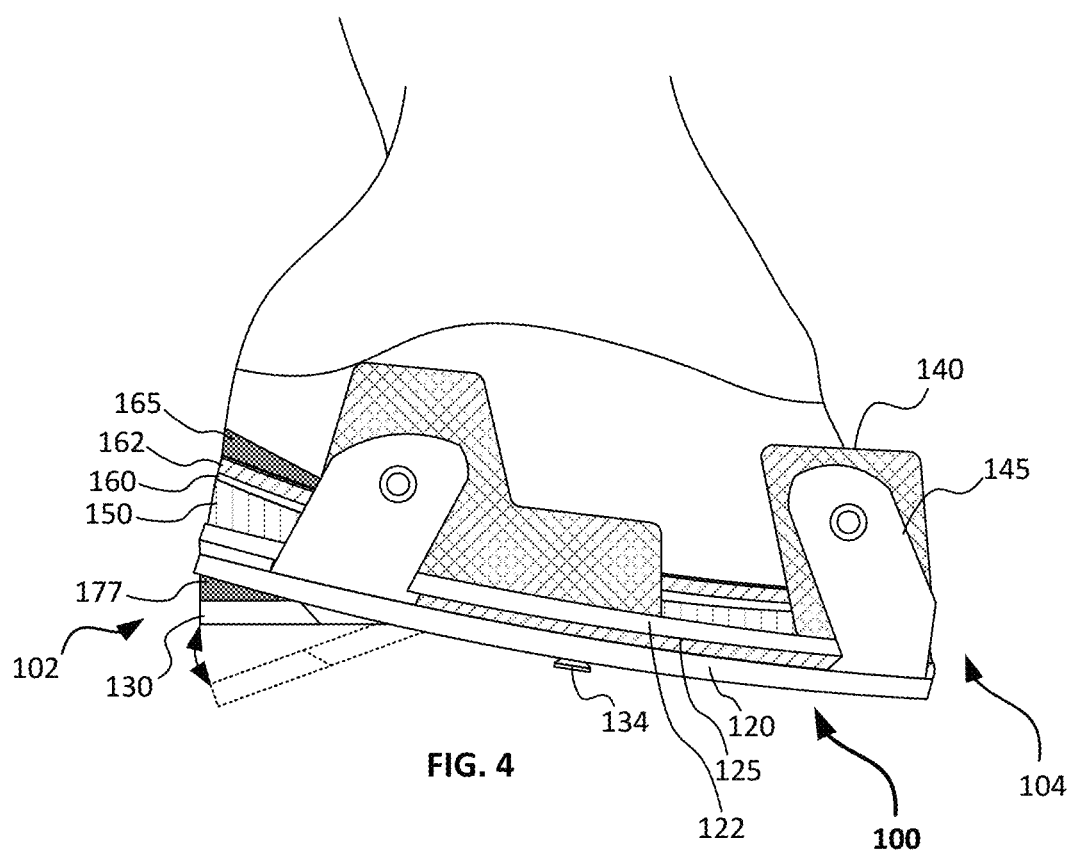
FIG. 4 is a schematic side view of the horseshoe of FIG. 1 during use.

FIG. 4 illustrates a side view of the horseshoe 100 being coupled to the hoof of an affected horse requiring support. As shown, wedge 130 raises the heel of the animal by a predetermined amount, while the main body provide support near the toe. Fabric 140 has been adhered to the hoof of the animal via epoxy or other suitable means to secure the horseshoe 100 to the hoof. Due to the adjustability of the various components, proper fitment may be achieved by articulating the wedge as shown and supplying a proper wedge support 177, if desired. In some examples, wedge support 177 may be formed of material similar to triangular cushion 165. Additionally, if it is necessary to provide additional or less support for the heel, the horseshoe can be adjusted. Certain adjustments may also be made without entirely removing the horseshoe from the hoof, and specifically without removing the fabric. For example, the wedge may be easily adjusted or replaced by actuating the fasteners without removal of the fabric from the animal.

Figure 5:
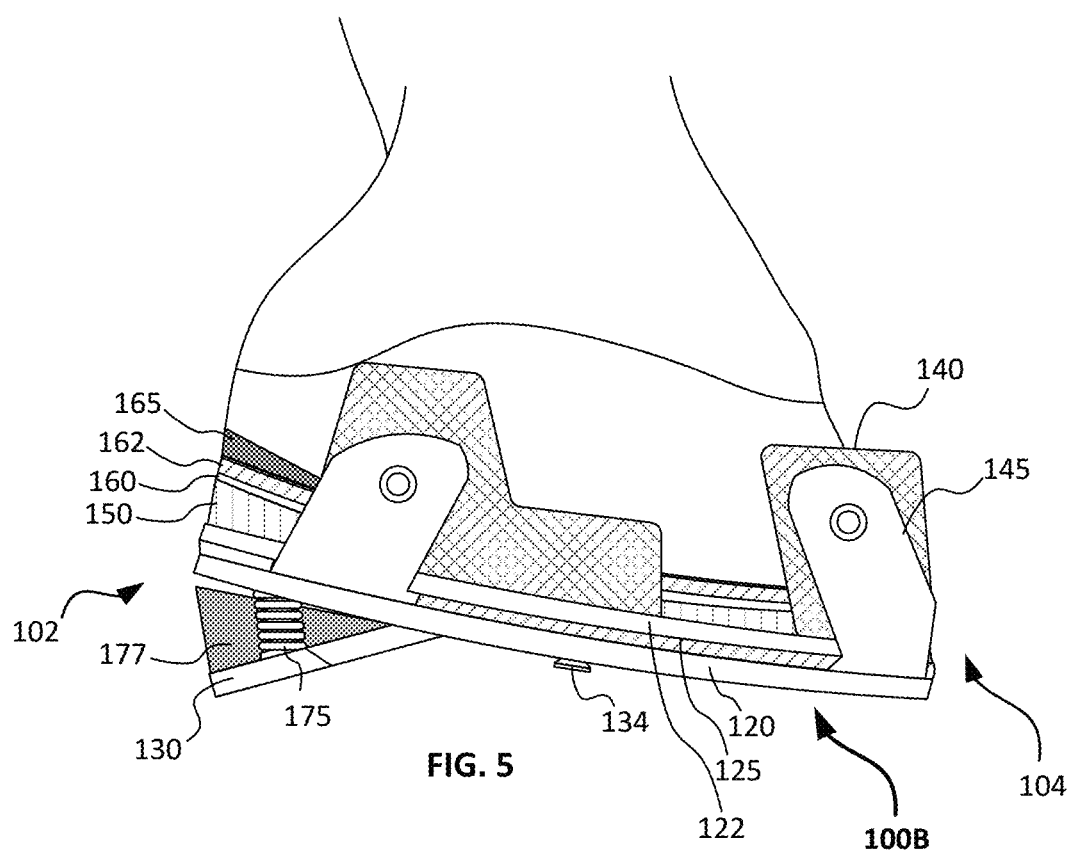
FIG. 5 is a schematic side view of another variation of the horseshoe.

FIG. 5 illustrates a side view of a horseshoe 100B that is similar to that described above with one modification. Notably, a pair of springs 175 are disposed between heel wedge 130 and base plate 120, the pair of springs 175 being disposed on opposing sides of wedge support 177. It will be understood that modifications are possible utilizing a single spring or that three or more springs may also be utilized. Additionally, instead of being disposed to the side of the heel wedge 130, the spring may be disposed on the heel wedge or directly contacting the heel wedge.

Although the invention herein has been described with reference to particular embodiments, it Is to be understood that these embodiments are merely illustrative of the principles and applications of the present invention. It is therefore so be understood that numerous modifications may made to the illustrative embodiments and that other arrangements may be devised without departing from the spirit and scope of the present invention as defined by the appended claims.

It will be appreciated that the various dependent claims and the features set forth therein can be combined in different ways than presented in the initial claims. It will also be appreciated that the features described in connection with individual embodiments may be shared with others of the described embodiments.

What is claimed is:

1. A horseshoe having a front end configured to be disposed adjacent a toe of a horse and a back end configured to be disposed adjacent a heel of the horse comprising:
    a base plate formed of two winged halves joined together to form an oval-shaped body having a rectangular lower slot at the back end and a U-shaped inward upper concavity at the front end, a middle of the U-shaped inward upper concavity being disposed closer to the rectangular lower slot than ends of the U-shaped inward upper concavity, the base plate having a first stiffness;
    an intermediate layer having a second stiffness, the second stiffness being less than the first stiffness, the intermediate plate being disposed adjacent the base plate;
    a top plate disposed adjacent the intermediate layer; and
    an inverted T-shaped heel wedge having an axial portion disposed within the rectangular lower slot of the base plate and a base portion overlapping portions of the base plate, the inverted T-shaped heel wedge being coupled to the base plate and capable of articulating relative to the base plate.

2. The horseshoe of claim 1, further comprising a fabric coupled to at least one of the base plate, the intermediate layer and the top plate.

3. The horseshoe of claim 2, further comprising an epoxy disposed on the fabric configured to couple the fabric to an animal's hoof.

4. The horseshoe of claim 1, further comprising a cushioning system including multiple layers.

5. The horseshoe of claim 4, wherein the cushioning system includes a lower layer, an intermediate layer, and an upper layer.

6. The horseshoe of claim 4, wherein the cushioning system includes at least one foam layer.

7. The horseshoe of claim 6, wherein the at least one foam layer includes apertures.

8. The horseshoe of claim 3, wherein the cushioning system includes a leather material.

9. The horseshoe of claim 1, further comprising at least one anchoring member.

10. The horseshoe of claim 9, wherein the at least one anchoring member comprises four anchoring members.

11. The horseshoe of claim 1, wherein the base plate and the top plate are of a same shape.

12. The horseshoe of claim 1, wherein the base plate and the top plate are metallic.

13. The horseshoe of claim 1, wherein the base plate and the top plate are fastened together with the intermediate layer sandwiched therebetween.

14. The horseshoe of claim 1, wherein the base plate and the top plate are generally egg-shaped with a lower slot and an upper concavity.

15. The horseshoe of claim 1, further comprising at least one spring in contact with the heel wedge.

\* \* \* \* \*